(12) United States Patent
Olivier et al.

(10) Patent No.: US 9,227,867 B2
(45) Date of Patent: *Jan. 5, 2016

(54) CREATION OF GLAZING COMPRISING AN OPENING

(71) Applicant: Saint-Gobain Glass France, Courbevoie (FR)

(72) Inventors: Thierry Olivier, Thourotte (FR); Frédéric Berthe, Compiegne (FR); Michael Labrot, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/317,223

(22) Filed: Jun. 27, 2014

(65) Prior Publication Data

US 2015/0052951 A1 Feb. 26, 2015

Related U.S. Application Data

(63) Continuation of application No. 13/254,084, filed as application No. PCT/FR2010/050364 on Mar. 4, 2010, now Pat. No. 8,800,321.

(30) Foreign Application Priority Data

Mar. 5, 2009 (FR) ..................... 09 51382

(51) Int. Cl.
*C03B 23/027* (2006.01)
*C03B 35/20* (2006.01)
(Continued)

(52) U.S. Cl.
CPC ........... *C03B 23/027* (2013.01); *C03B 23/0252* (2013.01); *C03B 27/0442* (2013.01); *C03B 35/202* (2013.01); *C03B 40/005* (2013.01)

(58) Field of Classification Search
CPC .............. C03B 23/027; C03B 23/0252; C03B 27/0442; C03B 29/08; C03B 23/025; C03B 23/0258; C03B 23/03; C03B 23/0352; C03B 23/0357; C03B 23/0307; C03B 35/202
See application file for complete search history.

(56) References Cited

U.S. PATENT DOCUMENTS 3,235,350 A * 2/1966 Richardson ..................... 65/107
3,293,020 A * 12/1966 Sleighter ......................... 65/111
(Continued)

FOREIGN PATENT DOCUMENTS

| CN | 1550365 | 12/2004 |
|----|---------|---------|
| CN | 1768011 | 5/2006 |

(Continued)

OTHER PUBLICATIONS

Combined Chinese Office Action and Search Report issued Jul. 10, 2013 in Patent Application No. 201080010672.0 with English Translation.

(Continued)

*Primary Examiner* — Jodi C Franklin
(74) *Attorney, Agent, or Firm* — Oblon, McClelland, Maier & Neustadt, L.L.P.

(57) ABSTRACT

The invention relates to a method for preparing a sheet of curved glass comprising an opening involving bending followed by cooling, the periphery of the sheet and the periphery of the opening being supported, at least at the start of cooling, by a skeleton.

37 Claims, 4 Drawing Sheets

(51) Int. Cl.
*C03B 23/025* (2006.01)
*C03B 27/044* (2006.01)
*C03B 40/00* (2006.01)

(56) References Cited

U.S. PATENT DOCUMENTS

| | | | | |
|---|---|---|---|---|
| 3,356,480 | A * | 12/1967 | Golightly | 65/103 |
| 4,052,185 | A * | 10/1977 | Kolakowski | 65/106 |
| 4,661,142 | A * | 4/1987 | Bartusel et al. | 65/348 |
| 4,778,507 | A | 10/1988 | Aruga et al. | |
| 4,889,547 | A * | 12/1989 | Lecourt et al. | 65/107 |
| 5,071,461 | A | 12/1991 | Hirotsu et al. | |
| 5,118,335 | A * | 6/1992 | Claassen et al. | 65/348 |
| 5,591,245 | A | 1/1997 | Salonen | |
| 5,974,834 | A * | 11/1999 | Rijkens et al. | 65/104 |
| 6,076,373 | A * | 6/2000 | Grodziski | 65/107 |
| 6,250,301 | B1 | 6/2001 | Pate | |
| 6,574,992 | B1 * | 6/2003 | Kuster et al. | 65/104 |
| 8,459,061 | B2 * | 6/2013 | Tetlow | 65/107 |
| 2002/0116951 | A1 * | 8/2002 | Dunifon et al. | 65/106 |
| 2004/0098946 | A1 | 5/2004 | Meerman | |
| 2004/0107729 | A1 | 6/2004 | Fukami et al. | |
| 2004/0129028 | A1 | 7/2004 | Balduin et al. | |
| 2006/0144090 | A1 | 7/2006 | Yoshizawa | |
| 2007/0026238 | A1 | 2/2007 | Chiappetta et al. | |
| 2007/0039354 | A1 | 2/2007 | Ollfisch et al. | |
| 2007/0157671 | A1 * | 7/2007 | Thellier et al. | 65/106 |
| 2008/0000267 | A1 * | 1/2008 | Fukami et al. | 65/106 |
| 2008/0134722 | A1 * | 6/2008 | Balduin et al. | 65/106 |
| 2009/0199595 | A1 * | 8/2009 | Machura et al. | 65/106 |
| 2009/0250532 | A1 | 10/2009 | Calvo et al. | |
| 2010/0043809 | A1 | 2/2010 | Magnon | |
| 2010/0059253 | A1 | 3/2010 | Labrot et al. | |
| 2010/0084894 | A1 | 4/2010 | Billy et al. | |
| 2012/0055197 | A1 | 3/2012 | Balduin et al. | |

FOREIGN PATENT DOCUMENTS

| | | |
|---|---|---|
| WO | WO 2007/077371 | 7/2007 |
| WO | WO 2007077371 A1 * | 7/2007 |
| WO | WO 2008/068325 | 6/2008 |
| WO | WO 2010/100223 | 9/2010 |

OTHER PUBLICATIONS

International Search Report issued Jul. 6, 2010 in PCT/FR10/050364 filed Mar. 4, 2010.

* cited by examiner

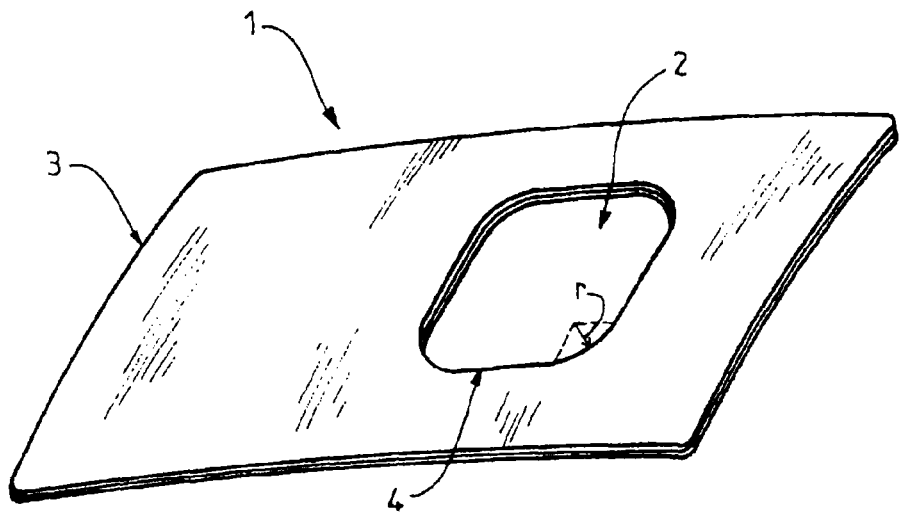
FIG.1
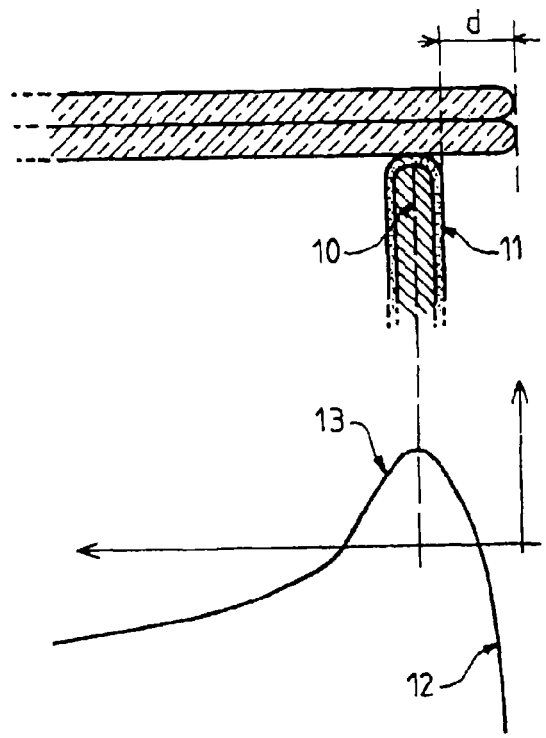
FIG. 2A
FIG. 2B

CREATION OF GLAZING COMPRISING AN OPENING

CROSS-REFERENCE TO RELATED APPLICATIONS

The present application is a continuation application of U.S. Ser. No. 13/254,084, filed Aug. 31, 2011, allowed, which is a U.S. national stage application under 35 U.S.C. §371 of International Application No. PCT/FR10/050364, filed Mar. 4, 2010, which claims the benefit of priority from French Application No. 09 51382, filed Mar. 5, 2009, the entire contents of which are hereby incorporated by reference.

The invention relates to a method of creating glazing comprising one or more opening(s) and that may notably act as a roof of a motor vehicle.

The creation of fixed glass canopies for motor vehicles offers a certain number of advantages such as esthetic appearance, cost, transparency, the possibility of fitting the roof with photovoltaic cells, etc. It may be desirable to add an opening function to this type of canopy by providing it with a window that can be accessed and opened from inside the vehicle. That entails knowing how to bend glazing equipped with a large-sized orifice without said orifice overly weakening it or noticeably altering its overall curvature, as these would detract from the esthetic appearance and functionality of the product and could produce optical defects. One of the major difficulties is to guarantee the close tolerances of the interior opening in relation to the exterior contour of the glazing in order to interface with the mobile roof. In addition, such glazing has to be sufficiently resistant to the forces exerted by the wind (known as the "wind load") which apply a heavy load thereto when driving along with the roof open or closed. It has also to be able to withstand a load such as one meter of snow. Another type of loading is the torsional effects which occur for example when one wheel of the vehicle is resting up on a sidewalk or when sharply mounting the kerb. It has been found that tensile stresses appear in the corners of the opening in the roof when the glazing is subjected to any kind of mechanical force.

U.S. Pat. No. 5,974,834 teaches how to bend and temper glazing comprising a small-sized hole, essentially for making holes in the back window of motor vehicles. Such a hole in a back window is essentially used for attaching an aerial or a stop light, which means that its area is of the order of 0.006 m$^2$ at most. Individual sheets of glass are bent under gravity on a frame comprising an additional support for the border of the orifice. This additional support is notched at its edge (as also taught in WO93/02017 or U.S. Pat. No. 5,118,335 regarding the external border of an unholed glazing) to make the edge of the glass more accessible to the annealing air. The edge of the glazing is supposed to sit right in the middle of the notching as shown in FIG. 5 of U.S. Pat. No. 5,118,335. According to U.S. Pat. No. 5,974,834, the support may also be a solid metal plate of larger area than the orifice so as to support the edges of the orifice during bending and tempering. A motor vehicle back window bending frame generally has a contact width of more than 5 cm.

Tests carried out by the applicant have demonstrated that this type of support for the edges of the opening is unable to lead to glazing that is sufficiently robust, particularly for "canopy with in-built sunshine roof" applications. In particular, a notched support appears to lead to a succession of compressions and tensions in the border of the glazing, which in fact weakens it considerably and what is more gives rise to prohibitive optical defects.

In the context of the present invention, in order to give the border of the opening sufficient strength, it has been decided that a ring of compression should be conferred upon it, this meaning that the extreme edge of the opening is systematically under compression for the entire perimeter of the opening. In addition, attempts have been made to give this compression a high value of at least 4 MPa, and preferably at least 6 MPa, and more preferably still at least 8 MPa, and even more preferably still, at least 9 MPa at any point on the perimeter of the opening. These values relate firstly to the sheet of glass in contact with the exterior surroundings of the motor vehicle and preferably also to the other sheet or sheets contained in the laminated glazing, and therefore also relate to the arithmetic mean of the stress values for all the sheets of the glazing.

BRIEF DESCRIPTION OF THE DRAWINGS

FIG. 1 represents a glazing of the present invention which is curved and has an opening.

FIG. 2A depicts, in cross section, two superposed sheets of glass carried by a support of the skeleton type.

FIG. 2B depicts the resulting distribution of stresses in the depiction of FIG. 2A.

Figure 3A:
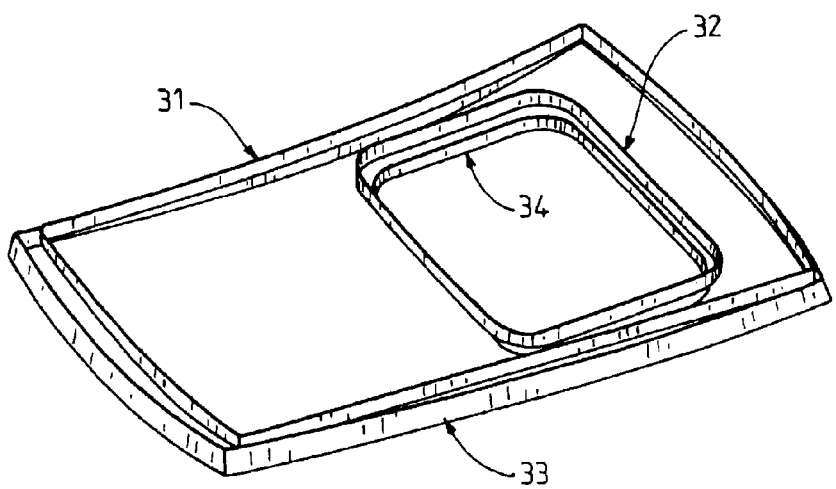
FIG. 3A depicts a device for gravity bending sheets of glass including a two-part double skeleton in which the roughing skeleton is in the uppermost position.

In order to achieve this objective, it has been found that the support for the border of the opening, at least at the time that cooling begins, was advantageously continuous (or linear, as opposed to "notched" as in U.S. Pat. No. 5,974,834) and parallel to the edge of the glazing. What that means is that at every point on the border of the support of the opening, the tangent to the support never crosses into said support, unlike the situation with the "notched" frame of the prior art. In addition, the support of the opening has to be relatively slender and be positioned a few mm, generally at least 2 mm and even at least 3 mm, away from the edge of the opening of the glazing it supports at the end of supporting. This type of support is often known by the term "skeleton". A skeleton is a thin strip of metal having one of its edge faces facing upward to support the glass, the thickness of said edge face generally ranging from 1 to 5 mm and more generally from 2 to 3.5 mm. At the end of bending, the skeleton is in continuous contact on the edge face with the glass (for the bending step that involves that particular skeleton). The skeletons are preferably coated with a fibrous material of the felt type or web of metal and/or ceramic refractory fibers, as is well known to those skilled in the art. These felts reduce the marking of the glass. This fibrous material generally has a thickness ranging from 0.3 to 1 mm.

Like the border of the opening, the exterior (or external) border of the glazing also preferably has a ring of compression of at least 4 MPa, and preferably at least 6 MPa, and preferably at least 8 MPa, and more preferably still, at least 9 MPa at any point on the perimeter of the sheet of glass. In order to achieve these values, the periphery of the sheet is supported by a skeleton at least at the start of cooling that has already been explained in respect of the opening. These values relate first of all to the sheet of glass in contact with the exterior surroundings of the motor vehicle (and therefore the sheet directly in contact with the skeleton) and preferably also relate to the other sheet or sheets contained in the laminated glazing, and therefore also to the arithmetic mean of the values of stress in all the sheets of the glazing.

The method according to the invention involves bending followed by cooling. Bending is performed at least in part, if not in full, on a bending skeleton, both at the border of the opening and at the exterior border of the glazing. According to the invention, bending is performed at least partially under gravity on a bending skeleton supporting the periphery of the sheet and the periphery of the opening.

The cooling is performed at least to start off with, on the skeleton, both at the border of the opening and at the exterior border of the glazing. The skeleton that supports the glass at the start of cooling is known as the "final skeleton", it being understood that this final skeleton may also be a bending skeleton and, in particular, the last bending skeleton in contact with the glass in cases where multiple skeletons are used. Thus, the entire bending and cooling operations may be formed on the same skeleton.

Thus, the invention relates first of all to a method for preparing a sheet of curved glass comprising an opening involving bending followed by cooling, the periphery of the sheet and the periphery of the opening being supported, at least at the start of cooling, by a skeleton (known as the "final" skeleton).

Advantageously, the final skeleton lies a distance away from the edge of the opening of the sheet with which it is in contact, of at least 2 mm and more generally at least 3 mm, for example at least 5 mm, at least at the start of cooling, that is to say with the final form of the sheet. The final skeleton is, at least at the start of cooling, in continuous contact with the glass along the edge face.

The method according to the invention is well suited to glazings of all sizes, even those of large size that may act as motor vehicle roofs. What is meant by large-sized glazing is glazing of which one face measures more than $0.8 \text{ m}^2$, or more than $1 \text{ m}^2$, or even more than $2 \text{ m}^2$ (of course, this refers to the total area of one main face comprising the surface area of glass plus the surface area of any opening). Large-sized glazings are particularly heavy and one might have thought that the supports would have left marks. This fear is all the more keenly felt since, in the case of a laminated glazing, the two sheets are bent at the same time, superposed on the bending support. The weight therefore increases very quickly with the increase in size of the glazing, all of which tends toward an increase in the risk of marking. While having an opening in the glazing in itself leads to production difficulties in terms of bending and in terms of a reduction in the mechanical strength of the final glazing, paradoxically a larger opening may have advantages if the choice has been taken to support the periphery of the opening during the bending and at the start of cooling. Specifically, a) the larger the opening, the greater the reduction in the weight of the glazing, which tends toward a reduction in marking, and b) the larger the opening, the longer its perimeter and therefore the longer the perimeter support surface, which means that the glazing is spread over a larger support surface area, again tending toward a reduction in marking. Thus, for preference, the opening has an area in excess of $0.03 \text{ m}^2$ and even in excess of $0.05 \text{ m}^2$ and even in excess of $0.08 \text{ m}^2$ and even in excess of $0.1 \text{ m}^2$ and even in excess of $0.2 \text{ m}^2$ and generally in excess of $0.3 \text{ m}^2$. In general, the opening has an area smaller than $1 \text{ m}^2$. For preference, the opening has an area greater than 5% or even greater than 10% of the total area of the glazing (of course the total area of a single main face comprising the surface area of glass plus that of the opening). In general, the opening has an area of less than 80% or even of less than 50% of the total area of the glazing.

It has been possible to demonstrate that too small a size of opening (measuring less than $0.03 \text{ m}^2$) was not favorable to the cooling of the borders of the opening which meant that the desired edge stresses could not be achieved. Specifically, it would seem that too small an opening leads to a mass effect that is prejudicial to effective cooling because of the large mass of glass surrounding the opening. The larger the opening, the more the cooling occurs in a similar way to the cooling conferred upon the exterior borders of the glazing, which means that the last support of the border of the opening at the start of cooling can actually be effected using a support of the skeleton type without that having detrimental consequences on edge stresses.

The cooling may be performed on superposed sheets in which case it is relatively slow. In such cases, the temperature of the glass is lowered below the gravity bending temperature down to 480° C. at a controlled rate generally less than 3° C. per second and generally greater than 0.2° C. per second. Below 480° C., it is possible to blow onto the glass to accelerate the cooling. The superposition of the sheets does not impede the obtaining of the desired edge stresses on each of the sheets considered individually. The cooling may be more rapid to the point of constituting semi-tempering, in which case this cooling is performed individually, sheet by sheet, rather than with the sheets superposed. In this case, the temperature of the glass is lowered below the gravity bending temperature down to 480° C. at a rate generally in excess of 10° C. per second and generally less than 150° C. per second. In all cases, cooling commences while the glass is still in contact with the final skeleton and this cooling is performed sufficiently rapidly to obtain the ring of compression with the desired compressive stress value (at least 4 MPa) at least in the case of the sheet of glass in direct contact with the skeleton and preferably for the other sheet (or sheets) juxtaposed thereon. The more rapidly the cooling is carried out, the greater the extent to which the compressive stress in the ring of compression is increased. That is true of the edge of the opening and of the exterior edge of the glazing.

According to the invention, the method may be applied to two sheets that are superposed during bending and cooling, or even to more than two sheets.

For sheets intended to be assembled within one and the same laminated glazing, the bending itself may be performed simultaneously on said superposed sheets. This bending may also be performed sheet by sheet (individual sheets not superposed) when the final step of bending is performed by pressing against a solid form. In all cases, however, it is preferable for at least the start of cooling to be carried out on the final skeleton when these sheets intended to be assembled are superposed.

For preference, the perimeter of the opening does not have a radius of curvature smaller than 15 mm and for preference no radius of curvature smaller than 60 mm, for example no radius of curvature smaller than 80 mm. The perimeter of the opening therefore has, at all points, a radius of curvature of at least 15 mm and preferably of at least 60 mm, for example of at least 80 mm. The opening may, for example, be circular or of the quadrilateral type with radiused corners as has already been stated. This feature relating to the radii of curvature is particularly favorable to the integrity of the glazing when subjected to torsion and tensile stresses in the corners.

The invention also relates to a method of gravity bending a sheet of glass (which covers the possibility of having several sheets of glass superposed, notably two of these) comprising an opening (which covers the possibility of having several openings in one and the same glazing), the periphery of the opening being supported during bending by a bending skeleton.

The bending skeleton comprises a part supporting the periphery of the glazing (or "exterior" or "external" periphery) and a part supporting the periphery of the opening. The same is true of the final skeleton.

That part of the skeleton that supports the opening may be fixed or articulated or multiple. For preference, this part is modified during bending so that its concavity when viewed from above increases during the course of bending. This modification in shape allows it better to follow the change in curvature during the course of bending so that the weight of the glass is spread over a larger support surface area for longer. This then reduces the tendency to marking and reduces the risk of reverse bending (the local formation of curvature in the opposite direction to the desired curvature). The increase in the concavity of the skeleton may be obtained using an articulated or multiple skeleton. An articulated skeleton is equipped with several parts articulated together and the geometry of which is modified during the course of bending. For preference, articulation is made to occur progressively (rather than suddenly) during the course of the bending.

A multiple skeleton comprises several single skeletons (generally two) with different concavities, which one after the other (the more concave one after the less concave one, when viewed from above) support substantially the same line of support (or lines that are very closely adjacent, and juxtaposed). The bending skeleton that is the first to support the glass is often known as the "roughing" skeleton and the bending skeleton that supports the glass last is known as the "finishing" skeleton.

That part of the bending skeleton that supports the exterior border of the sheet may be of the same type as the one used to support the border of the opening, or a different type. In all the cases, it is of the simple, articulated or multiple type. The type of skeleton is to be chosen according to the complexity of the shape of the sheet and as a function of the tolerances on the dimensions.

If the geometry of the sheet is difficult to achieve (pronounced curvatures in all directions and/or close tolerances), a skeleton the two parts of which are of the multiple type is advantageously used by way of skeleton supporting the exterior border and the border of the opening. In the case of multiple double skeleton parts, these each comprise (the one for the external edge and the one for the edge of the opening) two simple skeletons with different curvatures which support the glazing one after the other, the skeleton with the less pronounced curvature supporting the glazing first.

In all cases, the last shape of the bending skeleton completely conforms to the glass both at the periphery of the opening and at the periphery of the sheet. The same is true of the final skeleton in contact with the glass at the start of cooling.

The final skeleton supporting the edge of the opening has a shape substantially identical to the opening in the sheet with which it is in contact, while at the same time observing a setback ("d" in FIG. 2A) of a few mm, generally at least 2 mm, or even at least 3 mm at the start of cooling, that is to say when the sheet is fixed in its final form by cooling (the sheets are therefore bent at that time, a fact which is not depicted in FIG. 2A). The skeleton supporting the edge of the opening therefore generally has the same shape as the opening, enlarged by the magnitude of the setback "d" around its entire perimeter. The skeleton follows the shape of the opening over its entire perimeter, keeping substantially the same distance back from the edge of the opening.

The opening in the glass does not come too close to the exterior border of the glazing because that could overly weaken it, particularly during handling operations. Thus, the opening is at least 50 mm and preferably at least 100 mm, or even at least 150 mm away from the exterior border of the glazing.

The opening is generally made on the individual sheets before they are bent, and therefore when they are in the flat state. The opening is generally cut out using pressurized water jets. The cut edges (the external edge just like the edge of the opening) are subjected to suitable shaping between the cutting-out step and the bending step.

Before being combined into laminated glazing, one or more of the sheets intended to form such laminated glazing may be coated with enamel. In the case of a motor vehicle canopy combining two sheets of glass separated by a layer of polymer such as polyvinyl butyral (PVB), enamel may be applied notably to the concave face (therefore the one facing toward the interior of the vehicle) of one or other of the two sheets. This enamel is applied to the glass before it is bent.

The bending may be performed on the sheets considered individually or on the sheets in the superposed state. In all cases, gravity bending is performed with a glass at a temperature ranging between 600 and 700° C. and preferably between 550 and 650° C.

Gravity bending on a skeleton may be a preliminary bending step that is followed by a press bending step pressing against a concave or convex solid form. This compression bending is generally performed at between 600 and 620° C. In this case, in order to get back to the desired edge compression values (of at least 4 MPa) after compression bending, the borders of the glass (the exterior edge and the edge of the opening) are rested on the "final skeleton" in the hot state (glass temperature: between 600 and 700° C. and preferably between 550 and 650° C.) and cooling is begun while the glass is resting on this final skeleton. It is in fact contact between the border of the glass and the final skeleton at the start of cooling which causes the excellent observed edge compression. Cooling is performed in the ways already indicated above according to whether there is a desire for the glass to be semi-tempered or not.

If the gravity bending is performed with two sheets superposed, the sheet on the top may have an opening slightly larger than the one on the bottom, which means that the border of the sheet on the top will everywhere be set back a little with respect to the border of the sheet on the bottom, this setback ("x" in FIG. 7) preferably ranging between 0 and 15 mm, notably 3 and 10 mm. This offsetting of the openings in the two sheets makes it possible to ensure slightly more effective cooling of the bottom sheet which will then see an increase in its edge stresses. This bottom sheet during bending will become the top sheet of the motor vehicle canopy and it may be desirable for it to have particularly high edge stresses.

The sheets of glass to which the present invention relates generally have a thickness ranging from 1 to 4 mm.

FIG. 1 represents the type of glazing to which the present invention relates. This is laminated glazing 1 comprising two sheets of glass between which there is inserted a thin layer of polymer of the PVB type. This glazing is curved and has an opening 2 the surface area of which represents approximately 20% of the total surface area of the glazing. This glazing has two main faces. This glazing may act as a motor vehicle sunshine roof, it being possible for the opening to be equipped with an articulated flap. This glazing comprises an exterior border 3 and the opening 2 comprises a border 4. The opening 2 has a perimeter of the quadrilateral type, with the four corners having fairly large radii of curvature r.

FIG. 2A) depicts, in cross section, two superposed sheets of glass carried by a support 10 of the skeleton type covered with a felt 11 of refractory fibers. The skeleton is at a distance d ("set back") from the edge of the glass. FIG. 2B) depicts the resulting distribution of stresses in each of the final sheets. This diagram corresponds to a measurement of the inbuilt stresses using the "sharples", measurement tools commonly used by those skilled in the art for measuring stresses. It may be seen that the extreme edge of the sheets of glass is completely in compression because the part 12 of the stress curve is negative and therefore in the compression domain. By contrast, the zone of the glass which was just above the support 10 is in tension, because the part 13 of the stress curve is positive.

Figure 3B:
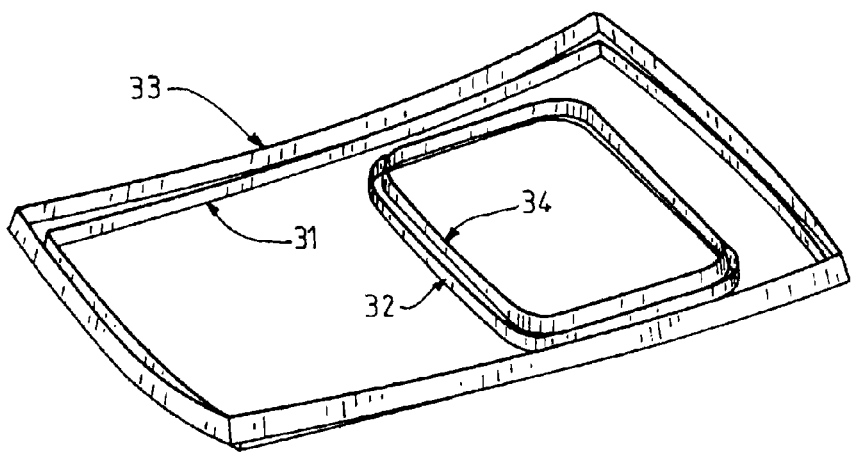
FIG. 3B depicts a device for gravity bending sheets of glass including a two-part double skeleton after the roughening skeleton has been lowered.

FIGS. 3A and 3B depict a device for gravity bending sheets of glass comprising a two-part double skeleton, one part (31, 33) for supporting the periphery of the sheets of glass and one part (32, 34) for supporting the periphery of the opening. Each component 31, 32, 33 and 34 is a simple skeleton in itself. In FIG. 3A it is the roughing skeleton that is in the uppermost position, that is to say both, on the one hand, the roughing skeleton that supports the periphery of the glazing and, on the other hand, the roughing skeleton that supports the periphery of the opening. The finishing skeletons 33 and 34 for the periphery of the glazing and for the periphery of the opening respectively, are in the lowermost position, with no possible contact with the glass. After a certain bending time, the roughing skeletons are lowered gradually and the glass (which has not been depicted) finds itself supported by the finishing skeletons 33 and 34 as depicted in FIG. 3B). In actual fact, the roughing skeletons 31 and 32 are connected to one another by fixed connections and the finishing skeletons 33 and 34 are also connected to one another by fixed connections. The switch from the roughing skeletons to the finishing skeletons is very gradual and performed by virtue of a device like the one depicted in FIGS. 1 to 5 of WO2007/077371.

Figure 4A:
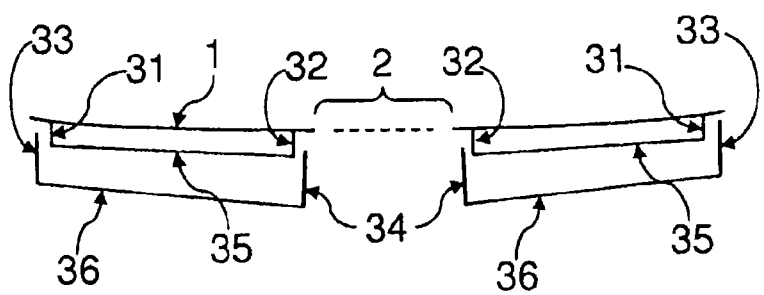
FIG. 4A shows the relative movement of the two pairs of skeletons during the bending of a sheet of glass resting on roughening skeletons.
Figure 4B:
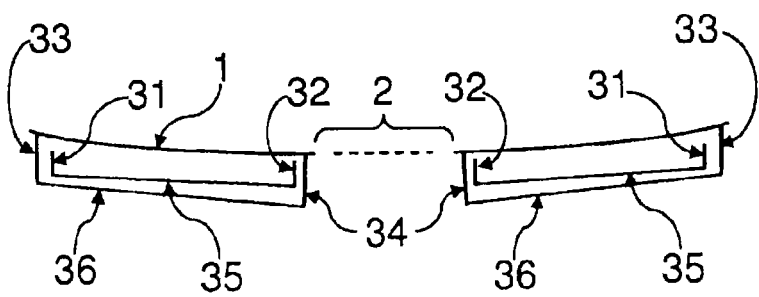
FIG. 4B shows the relative movement of the two pairs of skeletons during the bending of a sheet of glass resting on finishing skeletons.

FIGS. 4A and 4B show the relative movement of the two pairs of skeletons, the pair of roughing skeletons (31, 32) and the pair of finishing skeletons (33, 34) during the bending of a sheet of glass 1 provided with an opening 2. In FIG. 4A the sheet of glass 1 provided with an opening 2 rests on the pair of roughing skeletons, the roughing skeleton 31 supporting the periphery of the sheet and the roughing skeleton 32 supporting the periphery of the opening 2. In FIG. 4B the sheet of glass 1 provided with an opening 2 rests on the pair of finishing skeletons, the finishing skeleton 33 supporting the periphery of the sheet and the finishing skeleton 34 supporting the periphery of the opening 2. The roughing skeleton 31 and the roughing skeleton 32 are secured to one another because of their fixed connections 35. The finishing skeleton and the finishing skeleton 34 are secured to one another because of their fixed connections 36.

Figure 5:
FIG. 5 depicts an articulated skeleton that can be used to support the glass around the opening in accordance with the present invention.

FIG. 5 depicts an articulated skeleton that can be used to support the glass around the opening. This skeleton comprises two articulated lateral parts that can be raised during bending. It is considered that this movement causes an overall increase in the curvature or concavity (when viewed from above) of the skeleton. The skeleton that comes into contact with the periphery of the glazing is not depicted here.

Figure 6A:
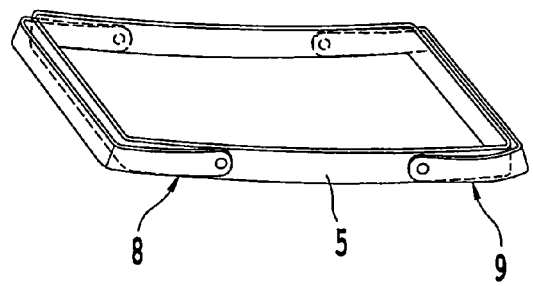
FIGS. 6A and 6B depict an articulated multiple skeleton including a first skeleton for supporting the perimeter of the opening at the start of bending, and two articulated lateral parts that can be raised during the course of bending.
Figure 6B:
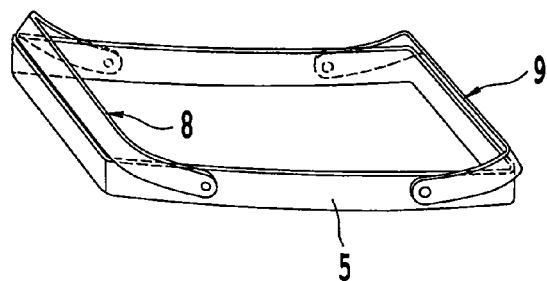

FIGS. 6A and 6B depict an articulated multiple skeleton comprising a simple first skeleton 5 for supporting the perimeter of the opening at the start of bending, two articulated lateral parts 8 and 9 that can be raised during the course of bending. It is considered that this movement increases the overall curvature or concavity (when viewed from above) of the skeleton. The skeleton which comes into contact with the periphery of the glazing is not depicted here.

Figure 7:
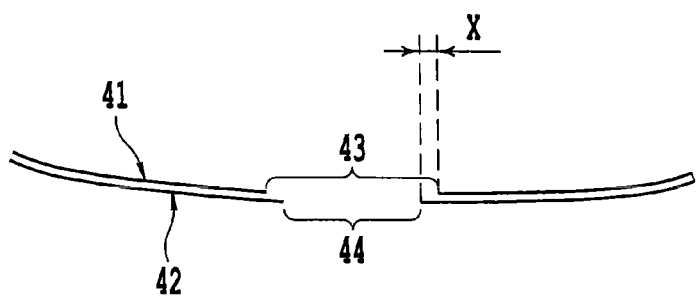
FIG. 7 depicts two sheets of glass superposed during bending.

FIG. 7 depicts two sheets of glass 41 and 42 which are superposed during bending (the support skeletons are not depicted), the top sheet 41 having a slightly larger opening 43 than the bottom sheet 42, so that the border of the top sheet is everywhere set back from the border 44 of the bottom sheet by x mm. This offsetting of the openings of the two sheets ensures slightly more effective cooling of the bottom sheet which then sees an increase in its edge stresses.

The invention claimed is:

1. A method for preparing a sheet of curved glass comprising an opening, the method comprising:
    bending the sheet of glass followed by cooling,
    wherein the bending is performed at least partially under gravity on a bending skeleton supporting a periphery of the sheet of glass and a periphery of the opening,
    wherein a periphery of the sheet of glass and a periphery of the opening therein are supported, at least at the start of the cooling, by a final skeleton comprising a linear strip of metal having an edge face facing upward to support the sheet of glass,
    wherein a concavity of at least one part of the bending skeleton that supports the periphery of the opening increases during bending,
    wherein the at least one part of the bending skeleton that supports the periphery of the opening comprises two skeletons which support the opening, sequentially, during the bending,
    wherein the cooling is sufficiently rapid enough to obtain a compressive stress value around a border of the opening of at least 4 MPa,
    wherein the opening has an area in excess of 0.03 $m^2$, and
    wherein the linear strip of metal is without notching and the final skeleton lies a distance away from an edge of the opening of at least 2 mm at least at the start of the cooling.

2. The method of claim 1, wherein a thickness of an edge face ranges from 1 to 5 mm.

3. The method of claim 1, wherein the final skeleton has the shape of the opening around its entire perimeter keeping the final sketch substantially the same distance away from the edge of the opening.

4. The method of claim 1, wherein a perimeter of the opening has, at all points, a radius of curvature of at least 15 mm.

5. The method of claim 4, wherein the perimeter of the opening has, at all points, a radius of curvature of at least 60 mm.

6. The method of claim 1, wherein the cooling is sufficiently rapid enough to obtain a compressive stress value at the border of the opening of at least 8 MPa.

7. The method of claim 6, wherein the cooling is sufficiently rapid enough to obtain a compressive stress value at the border of the opening of at least 8 MPa.

8. The method of claim 1, wherein the opening has an area in excess of 0.08 m$^2$.

9. The method of claim 1, wherein the opening has an area in excess of 0.1 m$^2$.

10. The method of claim 1, wherein the opening has an area in excess of 5% of a total area of a main face of the sheet of glass.

11. The method of claim 1, wherein the final skeleton is also a bending skeleton.

12. The method of claim 1, wherein
a part of a bending skeleton that supports the periphery of the sheet of glass comprises two skeletons which support the sheet of glass, sequentially, during the bending, and
a second skeleton that supports the sheet of glass after a first skeleton has a more pronounced curvature than the first skeleton.

13. The method of claim 1, wherein two sheets are superposed during the bending and the cooling.

14. The method of claim 1, wherein the final skeleton has the shape of the opening around its entire perimeter keeping the final sketch substantially the same distance away from the edge of the opening, and
wherein a perimeter of the opening has, at all points, a radius of curvature of at least 15 mm.

15. The method of claim 1, wherein the final skeleton is coated with a fibrous felt material or a web of metal and/or ceramic refractory fibers.

16. A method for preparing a sheet of curved glass comprising an opening, the method comprising bending the sheet of glass followed by cooling,
wherein
a periphery of the sheet of glass and a periphery of the opening therein are supported, at least at the start of the cooling, by a final skeleton,
the final skeleton comprises a linear strip of metal having an edge face facing upward to support the sheet of glass, a thickness of the edge face ranging from 1 to 5 mm,
the bending is performed at least partially under gravity on a bending skeleton supporting the periphery of the sheet of glass and the periphery of the opening,
a concavity of at least one part of the bending skeleton that supports the periphery of the opening increases during the bending,
the at least one part of the bending skeleton that supports the periphery of the opening comprises a first skeleton and a second skeleton, the second skeleton supporting the opening after the first skeleton during the bending, the second skeleton having a more pronounced curvature than the first skeleton,
at least one part of the bending skeleton that supports the periphery of the sheet of glass comprises a first skeleton and a second skeleton, the second skeleton supporting the opening after the first skeleton, during the bending, the second skeleton having a more pronounced curvature than the first skeleton,
the cooling is sufficiently rapid enough to obtain a compressive stress value around a border of the opening of at least 4 MPa, and
the opening has an area in excess of 0.03 m$^2$.

17. The method of claim 16, wherein the first skeleton supporting the periphery of the sheet and the first skeleton supporting the periphery of the opening are connected to one another and wherein the second skeleton supporting the periphery of the sheet and the second skeleton supporting the periphery of the opening are connected to one another.

18. The method of claim 17, wherein the final skeleton is also the second skeleton supporting the periphery of the opening and the periphery of the glass sheet.

19. The method of claim 16, wherein a perimeter of the opening has, at all points, a radius of curvature of at least 60 mm.

20. The method of claim 16, wherein two sheets are superposed during the bending and the cooling.

21. The method of claim 16, wherein the linear strip of metal is without notching.

22. The method of claim 16, wherein the linear strip of metal is without notching and the final skeleton lies a distance away from an edge of the opening of at least 2 mm at least at the start of the cooling.

23. The method of claim 16, wherein a perimeter of the opening has, at all points, a radius of curvature of at least 15 mm.

24. The method of claim 16, wherein the final skeleton has the shape of the opening around its entire perimeter keeping the final sketch substantially the same distance away from the edge of the opening, and
wherein a perimeter of the opening has, at all points, a radius of curvature of at least 15 mm.

25. The method of claim 16, wherein the final skeleton is coated with a fibrous felt material or a web of metal and/or ceramic refractory fibers.

26. A method for preparing a sheet of curved glass comprising an opening, the method comprising:
bending the sheet of glass followed by cooling,
wherein the bending is performed at least partially under gravity on a bending skeleton supporting a periphery of the sheet of glass and a periphery of the opening,
wherein a periphery of the sheet of glass and a periphery of the opening therein are supported, at least at the start of the cooling, by a final skeleton comprising a linear strip of metal having an edge face facing upward to support the sheet of glass,
wherein a concavity of at least one part of the bending skeleton that supports the periphery of the opening increases during bending,
wherein the at least one part of the bending skeleton that supports the periphery of the opening comprises two skeletons which support the opening, sequentially, during the bending,
wherein the cooling is sufficiently rapid enough to obtain a compressive stress value around a border of the opening of at least 4 MPa,
wherein the opening has an area in excess of 0.03 m$^2$, and
wherein a thickness of an edge face ranges from 1 to 5 mm.

27. The method of claim 26, wherein the linear strip of metal is without notching.

28. The method of claim 26, wherein the linear strip of metal is without notching and the final skeleton lies a distance away from an edge of the opening of at least 2 mm at least at the start of the cooling.

29. The method of claim 26, wherein the final skeleton has the shape of the opening around its entire perimeter keeping the final sketch substantially the same distance away from the edge of the opening.

30. The method of claim 26, wherein a perimeter of the opening has, at all points, a radius of curvature of at least 15 mm.

31. The method of claim 30, wherein the perimeter of the opening has, at all points, a radius of curvature of at least 60 mm.

32. The method of claim 26, wherein the opening has an area in excess of 0.08 m$^2$.

33. The method of claim 26, wherein the opening has an area in excess of 0.1 m$^2$.

34. The method of claim 26, wherein the opening has an area in excess of 5% of a total area of a main face of the sheet of glass.

35. The method of claim 26, wherein the final skeleton is also a bending skeleton.

36. The method of claim 26, wherein two sheets are superposed during the bending and the cooling.

37. The method of claim 26, wherein the final skeleton is coated with a fibrous felt material or a web of metal and/or ceramic refractory fibers.

* * * * *